US006435014B1

(12) United States Patent
Palmquist et al.

(10) Patent No.: US 6,435,014 B1
(45) Date of Patent: Aug. 20, 2002

(54) METHOD FOR DETERMINATION OF SURFACE TEXTURE

(75) Inventors: Fredrik Palmquist, Staffanstorp; Bengt-Göran Rosen, Halmstad; Matti Siivola, Kristianstad, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/577,477

(22) Filed: May 25, 2000

(30) Foreign Application Priority Data

May 28, 1999 (SE) ................................ 9901978

(51) Int. Cl.⁷ ............................ G01B 7/34; G01B 21/30
(52) U.S. Cl. ............................................ 73/104; 73/105
(58) Field of Search .................................... 73/104, 105

(56) References Cited

U.S. PATENT DOCUMENTS

| | | | |
|---|---|---|---|
| 3,112,642 A | 12/1963 | Harmon et al. | ................ 73/105 |
| 3,505,861 A | 4/1970 | Schoefer et al. | ................ 73/105 |
| 5,599,393 A | 2/1997 | Elvidge et al. | |

FOREIGN PATENT DOCUMENTS

| | | | | |
|---|---|---|---|---|
| JP | 7-259000 | * | 10/1995 | |
| WO | 08065 | | 2/1999 | ................ 73/105 |

* cited by examiner

*Primary Examiner*—Daniel S. Larkin
(74) *Attorney, Agent, or Firm*—Nixon & Vanderhye P.C.

(57) ABSTRACT

Method for determination of surface textures by a specified quantification of a maximal height of profile parameter (Rz) and a profile mean wavelength parameter (RSm).

11 Claims, 2 Drawing Sheets

METHOD FOR DETERMINATION OF SURFACE TEXTURE

FIELD OF THE INVENTION

The present invention relates to a method for determination of surface texture.

DESCRIPTION OF THE PRIOR ART

The visual appearance of injection moulded components are of great importance for the customer apprehension of the total product quality. When different suppliers are employed for the supply of sub-assemblies for e. g. mobile phones, such as batteries and front covers, problems occasionally arise when the parts are assembled. In large scale production it is necessary to provide a number of manufacturing tools and often to employ several different toolmakers in order to maintain the desired volumes. A product, e. g. a mobile phone, assembled by several different parts supplied from different manufacturers always differs from each other with regard to surface texture resulting in poor fit, mismatching colour, and gloss, etc.

In the mechanical industry, roughness metrology has been employed for several years as a method for quantitative specification and measurement of tools. The presently used surface topography specification is based on comparisons of e. g. polymer masters which should meet the quantitative requirements of the German VDI scale of surface textures (VDI 3400: June 1975). This scale is a logarithmic scaling of peak-to-valley and average-height amplitudes of the surface texture as measured on tools of typically VDI 12 to 45, which indicate the average roughness. Masters are produced from the VDI specified tools and are used only for qualitative evaluations of the finished products. Other methods used today are visual master plates and comparison between parts.

However, the qualitative comparisons between polymer masters and final products give a total tolerance range which is too wide and varying in order to achieve satisfactory quality control.

The specification of tools in accordance with the VDI classes results in the surface texture being specified in amplitude only, not in wavelength. This leads to an inaccurate specification of the surface texture with no quantitative possibility to pick up common injection moulding manufacturing problems like varying mould temperatures, varying pressure, and material variations. Unsatisfactory specifications do not only result in topographical variations in the end products but also in related problems-concerning varying tactile- and colour/gloss properties.

SUMMARY OF THE INVENTION

The object of the invention is to provide a solution to the above mentioned problems. This is achieved by a method for determination of surface texture in which a specified quantification of the surface texture is achieved by a combination of a maximal height of profile parameter (Rz) and a profile mean wavelength parameter (RSm).

Preferred embodiments of the invention are provided in the dependent claims.

By the invention, a method is provided using a combination of only two ISO standardised parameters. Hereby a sharp tool is received, not only able to objectively classify surface textures into a specified scale of work piece texture, but also able to detect known texture problems, such as poor replication of the die texture in the work piece due to process or material defects.

Of all the different ISO parameters available, two parameters have shown to be particularly relevant for important requirements such as colour, tactile response, and gloss. These two parameters are maximal height of profile (Rz) and profile mean wavelength (RSm). Thus, colour, tactile response, and gloss are related to the scale parameters and may be better controlled.

The design of process models makes it possible to directly determine machining parameters for individual machines for a given specification of the work piece texture, resulting in shorter lead times for the tool.

By the method of the invention, a specified quantification of the surface texture is achieved. Thus, the old and subjective method of characterisation of the surface texture is replaced. Instead an objective method for characterisation of surface texture both on a tool surface and a plastic surface of the end product is achieved.

The use of the roughness parameters in two dimensions in accordance with the method of the invention is a cheap and convenient method. The measuring equipment and the method is standardised and industrially accepted. Due to the method of the invention it is easier to buy new tools from different toolmakers and to check the tool quality before launch thereof. This is of importance for large scale production.

The method of the invention has been developed to give a standard for an objective quantifying of plastic surfaces. However, the proposed method of the invention to characterise surface textures is applicable not only to injection moulding of electro discharge machined (EDM) surfaces. It is also applicable to other mould materials, such as light metals and alloys of light metals, along with tool textures not only machined by EDM, but also etched surfaces. The light metals may be Al, Mn, Zn etc.

BRIEF DESCRIPTION OF THE DRAWINGS

A preferred embodiment of the present invention will now be further described below, reference being made to the accompanying drawings, in which.

DETAILED DESCRIPTION OF THE INVENTION

The method of the invention relates to a specification based on a combination of maximum height of profile (Rz) and profile mean wavelength (RSm) surface texture parameters to be used for both tool and work piece control via roughness measurements according to the ISO GPS standard package defined below. The specification of the work piece surface is based on goal and tolerance limits for the two roughness parameters simultaneously.

By the specified quantification according to the present invention, it is possible to control the characteristics concerning colour, tactile response, and gloss. For different surfaces the goal and tolerance limits are set differently depending of the use of the end product. By setting varying tolerances, it is possible to define a series of standard texture. The different standards are defined by the tolerances for Rsm and Rz, respectively. The standards may also define the number of measurements to be made.

Figure 1:
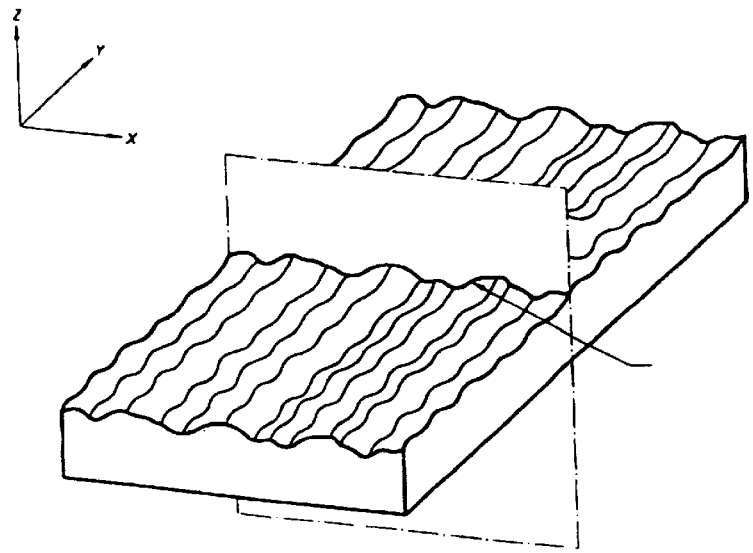
FIG. 1 shows a surface profile.

A surface profile is shown in FIG. 1 and is defined as a profile that results from an intersection of the real surface of the item by a specified plane. In practice, a plane with a normal that lies parallel to the real surface and in a suitable direction, is preferably chosen.

Figure 2:
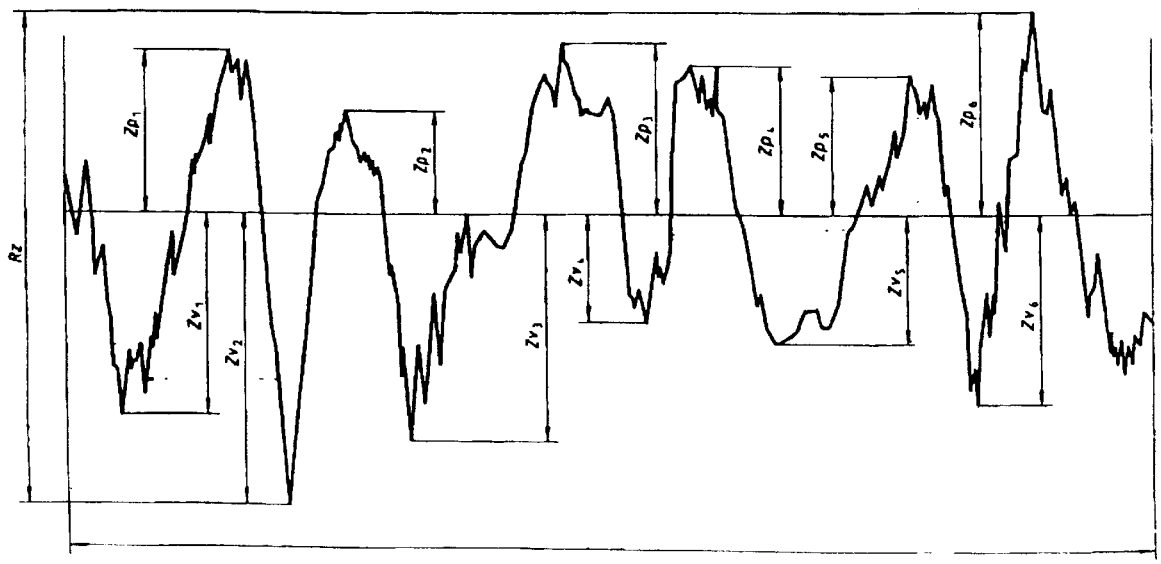
FIG. 2 shows an example of a roughness profile, wherein the maximum height of the profile Rz, is defined.

In FIG. 2, an example of a roughness profile is shown, wherein the maximum height of the profile Rz, is defined. The maximum height of profile is defined as the sum of the largest profile peak height and the largest profile valley depth within a sampling length.

Figure 3:
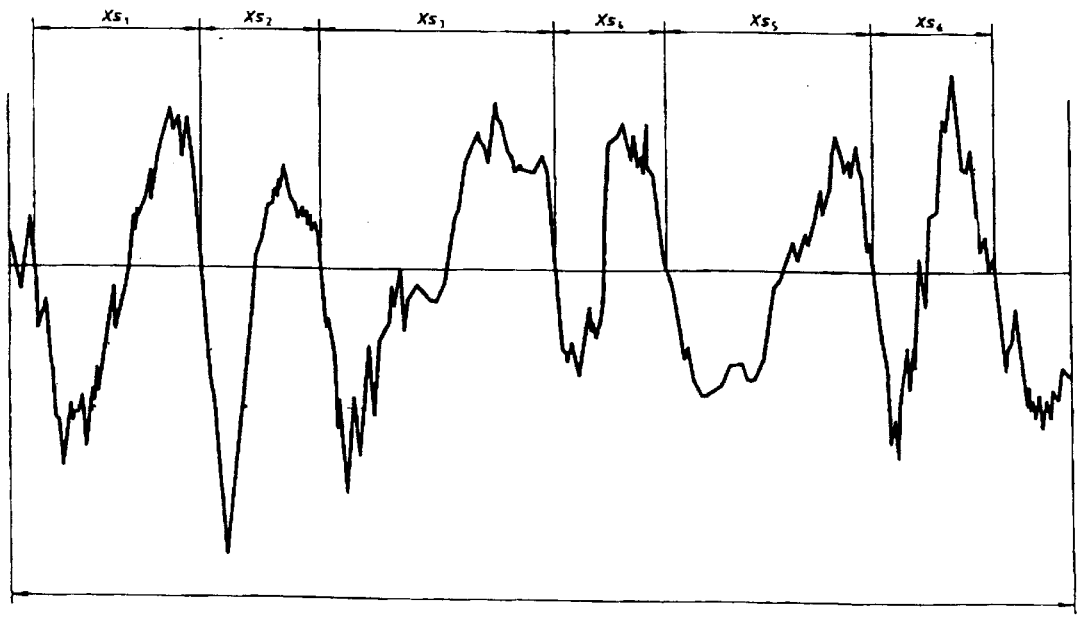
FIG. 3 shows an example of a roughness profile, wherein RSm is defined, i.e. the mean value of the profile element widths (wavelengths) Xs within a sampling length.

In FIG. 3, an example of a roughness profile is shown, wherein the mean value RSm of the profile elements widths (wavelengths) Xs within a sampling length, is defined. Thus, RSm is defined as:

$$1/m \sum_{i=1}^{m} Xsi$$

Normally the Rz and RSm parameters are taken as the mean of a number of measurements taken at different locations on the surface. The number of measurements should be more than three and is preferably five. A person skilled in the art realises that the number of measurements may be varied depending on the accuracy wanted and the allowable costs. The measurements are taken at different planes as indicated in FIG. 1.

Figure 4:
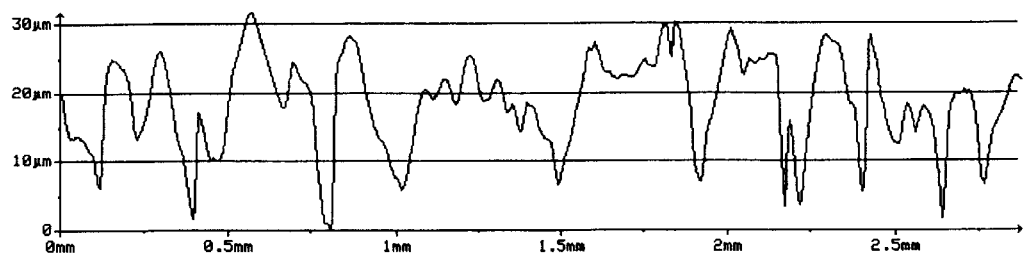
FIG. 4 shows a surface profile of an electro discharge machined (EDM) surface.

In FIG. 4, a surface profile of an electro discharge machined surface is shown. By measuring the surface of a work piece and at the same time measuring the tool surface and using the specified quantification of the invention, a powerful means for correlating the work piece texture to the machining parameters is achieved. By the method of the invention, it is possible to overcome presently existing problems with occurring differences in machine parameters between machine manufacturers. Since there is a mathematical relationship between work piece and tool it is possible to estimate the surface texture of the finished work piece. Previously, it was only possible to achieve the same surface texture when the same machine and the same settings, electrodes, tool material etc., was used. Furthermore, the setup time for the machines is reduced by the present invention. However, in high volume production several different EDM machines are needed and often they come from different suppliers resulting in different surface textures, colour, gloss, sink marks texture feelings, etc. Furthermore, these differences can only be detected when the final product is examined, which in turn is time consuming and expensive.

By controlling the surface texture of the tool it is possible to control the surface texture of the end product.

What is claimed is:

1. A method comprising determination of surface textures, characterized in that a specified quantification of the surface texture is achieved by a combination of only a maximal height of profile parameter (Rz) and a profile mean wavelength parameter (RSm).

2. Method according to claim 1, wherein the maximal height of profile parameter and the profile mean wavelength parameter are taken as the mean of a number of measurements at different locations on the surface.

3. Method according to claim 2, wherein the number of measurements is over three.

4. Method according to claim 3, wherein the number of measurements is five.

5. Method according to claim 1, wherein the surface is a polymer surface.

6. Method according to claim 1, wherein by specifying goal and tolerance limits for the combination of maximal height of profile parameter (Rz) and profile mean wavelength parameter (Rsm), a series of standard textures are defined.

7. Method according to claim 1, wherein variations of the surface texture due to a production process of finished products are predicted and corrected by using the specified parameters.

8. A method comprising determination of surface textures, characterized in that a specified quantification of the surface texture is achieved by a combination of a maximal height of profile parameter (Rz) and a profile mean wave-length parameter (RSm), and wherein the surface is a surface of Al, Mn, or Zn.

9. A method comprising determination of surface textures, characterized in that a specified quantification of the surface texture is achieved by a combination of a maximal height of profile parameter (Rz) and a profile mean wave-length parameter (RSm), and wherein the surface is a surface of an alloy comprising Al, Mn, or Zn.

10. A method comprising determination of surface textures, characterized in that a specified quantification of the surface texture is achieved by a combination of a maximal height of profile parameter (Rz) and a profile mean wave-length parameter (RSm), and by the specified quantification, information on the properties concerning colour, tactile response, and gloss is received.

11. A method comprising determination of surface textures, characterized in that a specified quantification of the surface texture is achieved by a combination of a maximal height of profile parameter (Rz) and a profile mean wave-length parameter (RSm), and wherein surface texture of a finished product is predicted by measuring and specifying the texture of a tool surface.

* * * * *